United States Patent
Gerstel et al.

(10) Patent No.: US 7,724,676 B2
(45) Date of Patent: May 25, 2010

(54) PROACTIVE PROTECTION MECHANISM BASED ON ADVANCED FAILURE WARNING

(75) Inventors: Ornan Gerstel, Los Altos, CA (US); Gabriele Maria Galimberti, Bovisio Masciago (IT); Loukas Paraschis, Palo Alto, CA (US); Anand Girish Parthasarathy, San Jose, CA (US); Humayun Sohel, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 480 days.

(21) Appl. No.: 11/726,225

(22) Filed: Mar. 21, 2007

(65) Prior Publication Data

US 2008/0232244 A1 Sep. 25, 2008

(51) Int. Cl.
*H04L 12/26* (2006.01)
(52) U.S. Cl. .................... 370/242; 398/45; 398/188; 714/758
(58) Field of Classification Search ............... 370/228, 370/242.1, 392; 398/45, 188; 714/758
See application file for complete search history.

(56) References Cited

U.S. PATENT DOCUMENTS

| 5,764,651 | A | 6/1998 | Bullock et al. |
| 6,993,700 | B1* | 1/2006 | Player et al. ............... 714/758 |
| 2004/0114925 | A1* | 6/2004 | Berthold et al. .............. 398/45 |
| 2004/0184819 | A1* | 9/2004 | Vassilieva et al. .......... 398/188 |
| 2004/0208591 | A1 | 10/2004 | Willebrand et al. |
| 2007/0076720 | A1* | 4/2007 | Wu ........................... 370/392 |
| 2007/0081465 | A1* | 4/2007 | Puppa et al. ............ 370/241.1 |

* cited by examiner

*Primary Examiner*—Albert T Chou
(74) *Attorney, Agent, or Firm*—Michael C. Stephens, Jr.; Trellis IP Law Group, PC

(57) ABSTRACT

In one embodiment, an apparatus can include: (i) logic configured to detect an advanced warning indication, such as for a degraded signal condition, on a first link between first and second network devices, where the detection can utilize a number of corrected bits and forward error correction (FEC), for example; and (ii) logic configured to reroute packet traffic from the first link to a second link when the degraded signal condition is detected.

23 Claims, 11 Drawing Sheets

PROACTIVE PROTECTION MECHANISM BASED ON ADVANCED FAILURE WARNING

TECHNICAL FIELD

The present disclosure relates generally to proactive protection mechanisms for reducing traffic impact using forward error correction statistics, as well as other indications from the optical layer.

BACKGROUND

Various mechanisms at layers 2 and 3 can provide protection against network failures. Some of these mechanisms (e.g., multiprotocol label switching (MPLS) fast reroute (FRR)) may be relatively fast, and may guarantee a short duration from failure detection to diversion of traffic onto an alternate route. Other mechanisms, such as interior gateway protocol (IGP) routing protocols, such as open shortest path first (OSPF), can take longer to converge. Newer protocols, such as Internet protocol (IP) FRR are also being implemented.

In such conventional approaches, the switching criterion may be a failure of a signal at an incoming synchronous optical networking (SONET) or other interface. These failures may typically be "hard" failures, such as loss of signal. While protection could be triggered by a degradation of the signal, these degradations may be rare when a router interface is connected to a dense wavelength-division multiplexing (DWDM) transport network because the signal is likely to be corrected via a transponder, as long as the error rate is below a certain level. Once the error rate exceeds a given level, the signal can become corrupt, and result in a traffic hit while the router switches to a protection path.

DESCRIPTION OF EXAMPLE EMBODIMENTS

Overview

In one embodiment, an apparatus can include: (i) logic configured to detect an advanced warning indication on a first link between first and second network devices, where the advanced warning indication may be indicative of an upcoming degraded signal condition; and (ii) logic configured to trigger packet traffic rerouting from the first link to a second link in response to the advanced warning indication.

In one embodiment, a method can include: (i) detecting in a first network device an upcoming degraded signal condition on a first link, the first link coupling the first and a second network device; and (ii) transmitting an advanced warning indication from the first to the second network device.

Example Embodiments

Figure 1:
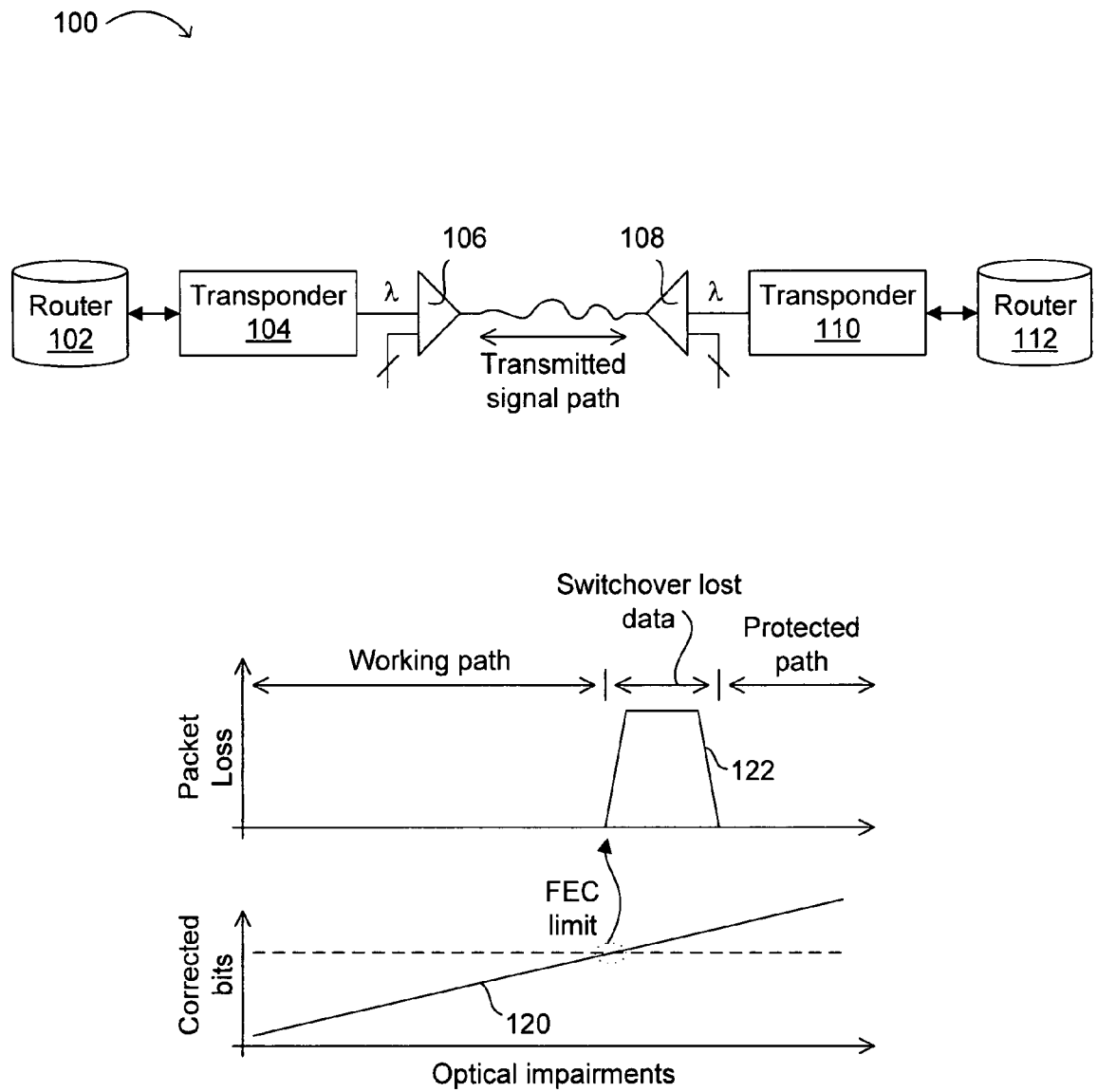
FIG. 1 illustrates an example discrete router/transponder arrangement and operation graph.

Referring now to FIG. 1, an example discrete router/transponder arrangement and operation graph is shown and indicated by the general reference character 100. Forward error correction (FEC) may be inserted at transponder 104. Such FEC can include redundancy in the signal and/or frame to be transmitted. Transponder 110 may essentially clean up distortions or noise effects in the transmitted signal, and then send a relatively clean signal to router 112. A short reach (SR) interface or a packet over SONET (synchronous optical networking) (POS) interface can be used between each transponder and router (e.g., between router 102 and transponder 104, and between router 112 and transponder 110), for example.

In the transmit direction, a transponder may be a device that converts a short reach interface from a router into a dense wavelength-division multiplexing (DWDM) wavelength, and can also generate a transport (G.709) frame. In the receive direction, a transponder can provide termination of G.709, correction of errors, and conversion back to the short reach interface, for example. Such a frame can contain an FEC mechanism for correcting errors introduced during transmission, or due to a degrading signal. As a result, the router may typically see a good signal with relatively few errors.

Accordingly, transponders can be used to insert FEC on the transmission end, and clean up the received signal using the FEC on the receive end. Signals having other wavelengths can be combined with the signal in a wavelength combiner/splitter 106, as well as wavelength combiner/splitter 108. The transmitted signal can traverse a range of distances (e.g., 10 m to 1000 km), networks, and/or paths, depending on a particular physical path taken, and perhaps traverse multiple optical elements, such as amplifiers and reconfigurable optical add/drop multiplexers, for example. At the other end of the particular path shown, the different wavelengths may be separated by wavelength combiner/splitter 108. For example, the path may include fiber optic cables. This transmission layer can induce errors in the signals, such as due to fiber properties, or due to physical properties of amplifiers and/or other devices in the system.

Even when an error rate increases, the transponder may mask these errors from a corresponding router, until the errors reach a level that is no longer correctable. Once this happens, the signal into the router can become corrupt, and the sending router may need to quickly switch away to a protection path, perhaps losing some packets in the process. With an IP over DWDM architecture, the transponder may be eliminated and a G.709 framer, including FEC, can reside on a router interface card. As shown in the graph portion of FIG. 1 (e.g., line or waveform 120), errors seen in a transponder can get worse over time, but still be within a "working" or sufficiently functional path. When the number of corrected bits at a transponder accumulates such that waveform 120 crosses the number of errors correctible by FEC limit, or a number of errors tolerated in a given application or system, a packet loss can increase as shown in waveform or graph 122. Accordingly, there may be lost data during the switchover, and prior to entering a protect path, as shown.

Figure 2:
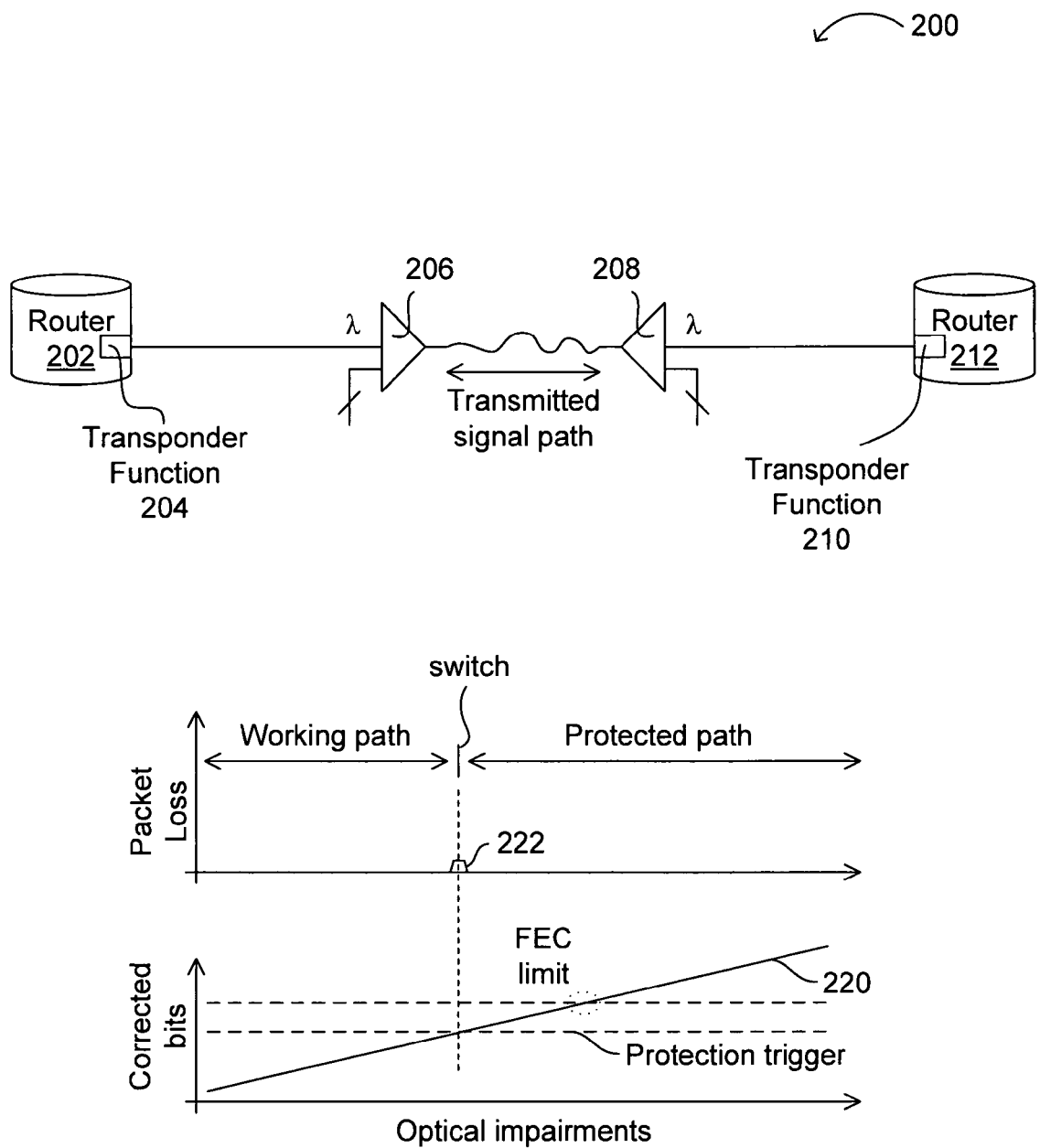
FIG. 2 illustrates an example integrated router/transponder function and operation graph.

Referring now to FIG. 2, an example integrated router/transponder function and operation graph is shown and indicated by the general reference character 200. This particular example may represent a 10 GE (Ethernet) wavelength-division multiplexing (WDM), plus a G.709 framer on each router. Router 202 can include transponder function 204, which can connect to wavelength combiner/splitter 206 for transmitting a signal along the particular example path as shown. Similarly, router 212 can include transponder function 210, which can connect to wavelength combiner/splitter 208.

Further, the FEC limit can be a predetermined value, and may be experimentally determined, and set automatically or user-programmed, for example. Also in particular embodiments, if interfaces between routers and corresponding transponders are sufficiently fast links, a protection trigger threshold set below the FEC limit may allow for protection without losing any packets. For example, a fast signal link in particular embodiments can utilize overhead in a G.709 frame, or an Ethernet connection with use of a protocol, such as link management protocol (LMP).

As shown in the graph portion of FIG. 2, a separate protection trigger can be included at a level below the FEC limit. The protection trigger can be predetermined (e.g., experimentally determined), and may be user-programmable and/or automatic, for example. As shown in the graph, when a number of corrected bits surpasses the protection trigger (see, e.g., waveform 220), a "hitless" switch, or a switch that retains substantially all packets, or one that has no substantial loss, can be made. For example, waveform 222 may indicate a minimal level of packet loss during a switchover. In this fashion, visibility of a router into transmission layer performance can allow for improved protection as compared to transponder-based networks.

As a result, the router can have visibility into errors before the errors have been corrected by the FEC mechanism. Such errors can be referred to herein as "pre-FEC" errors. Then, the protection mechanism can be triggered proactively before the error rate causes traffic outages. This hitless protection may be important for video traffic, as loss of a single intra- or I-frame in a moving picture experts group (MPEG) stream may result in a resynchronization of that stream, a visible outage.

In particular embodiments, a packet protection scheme may be based on a high number of pre-FEC errors. Further, the packet protection scheme may be implemented at IP, multiprotocol label switching (MPLS), and/or Ethernet levels. Once a number of pre-FEC errors reaches a certain threshold, a special form of trigger may be sent to the protection scheme for a "forced switch." Further, any packet switching device, such as a router, Ethernet switch, MPLS switch, or any other suitable device can be utilized in particular embodiments. In addition, any type of advanced failure warning, such as an increased error rate, a spike in errors, or the like, could also be used in particular embodiments. Also, operator override can be used in place of an advanced failure warning so that an operator can take down a piece of equipment for maintenance, for example.

In particular embodiments, relatively slow signal degradation, as well as some fast signal error events may be protected. For example, slow signal degradation due to fiber plant aging, pinched patch cord, or high polarization mode dispersion (PMD) can be accommodated. Also, fast events, such as cable cuts (e.g., in the hundreds of milliseconds), human error, and erbium-doped fiber amplifier (EDFA) problems can be accommodated. Also, any suitable type of fast convergence mechanism may be used as an interface for rerouting to a protection path. For example, MPLS fast reroute (FRR), Internet protocol (IP) FRR, and interior gateway protocol (IGP)/border gateway protocol (BGP), can be accommodated.

Figure 3:
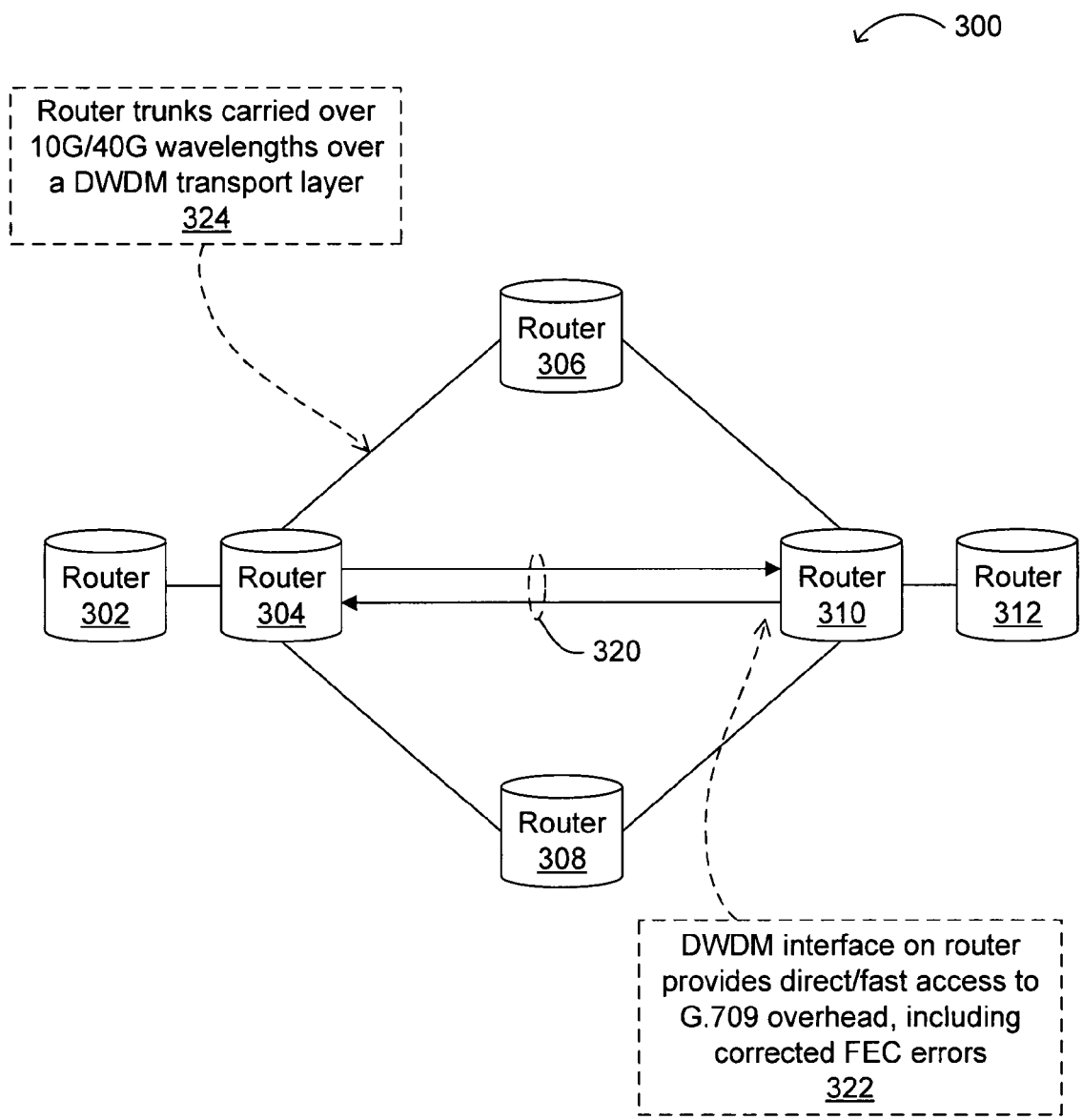
FIG. 3 illustrates an example router protection scheme.

Referring now to FIG. 3, an example router protection scheme is shown and indicated by the general reference character 300. Router 302 can interface with router 304, which can interface with routers 306, 308, and 310. Router 312 can also interface with router 310. Path 320 can include frames (e.g., G.709), including FEC, and other portions. Path or link 324 can include router trunks carried over 10G/40G wavelengths over a DWDM transport layer, for example. In addition, interface 322 can be a DWDM interface on router 310 that can provide direct and relatively fast access to G.709 overhead (e.g., corrected FEC errors).

Figure 4:
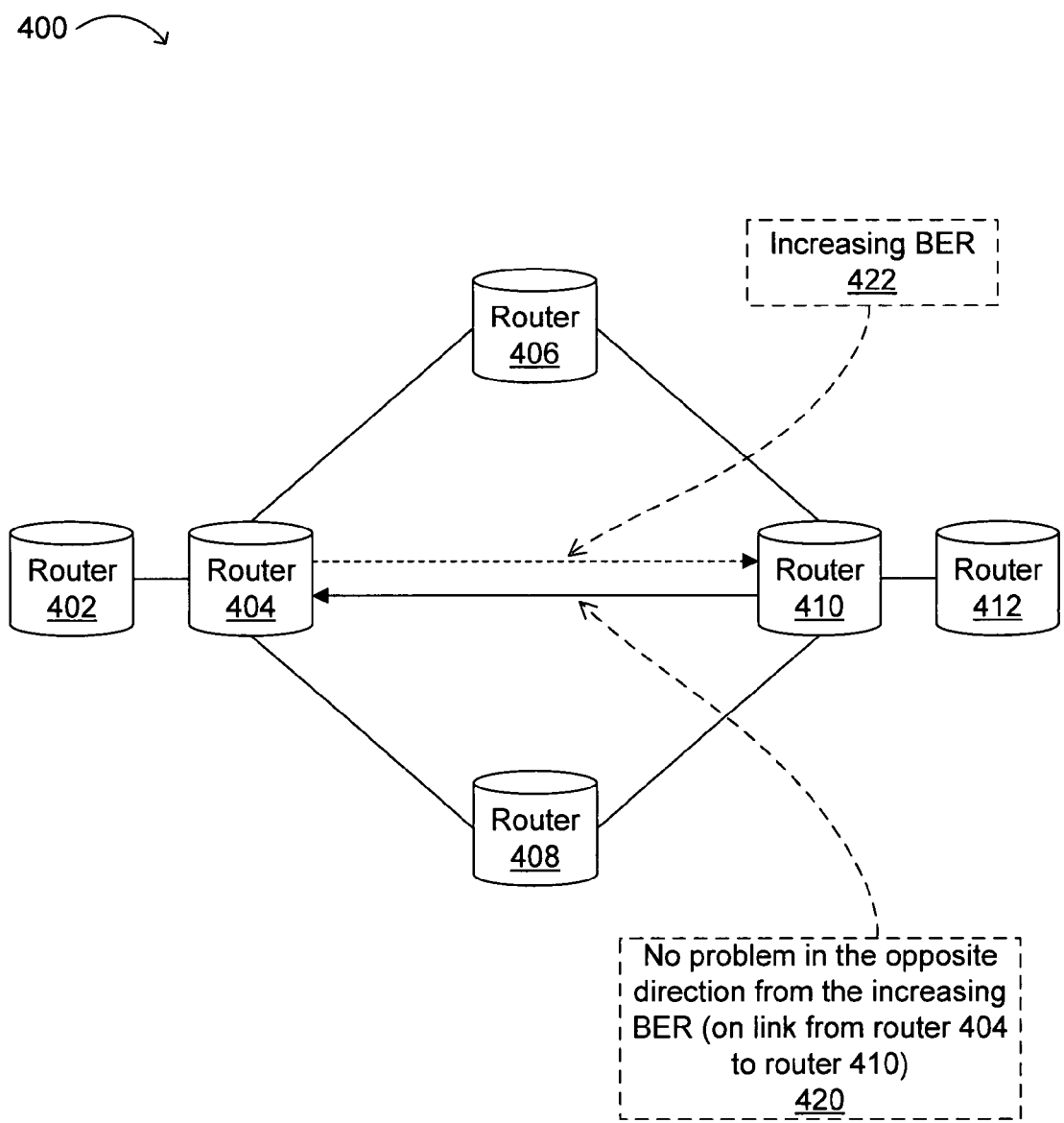
FIG. 4 illustrates an example router protection scenario with increasing bit error rate (BER) in one direction.

Referring now to FIG. 4, an example router protection scenario with increasing BER in one direction is shown and indicated by the general reference character 400. Routers 402, 404, 406, 408, 410, and 412 can be arranged in this particular example as shown. Also, other networks and/or routers, switches, or other network devices can be included in particular embodiments. In FIG. 4, a BER increase in direction or path 422 (with a link shown as a dashed line) may not provide a problem in the opposite direction/path 420 (with a link shown as a solid line). In particular embodiments, in order to signal back to router 404 from router 410 that path 422 has an accumulated error value or number of corrected bits above the protection trigger, a flag (e.g., a bit, byte, or other suitable portion) of a G.709 frame can be utilized. For example, a byte in the Optical Data Unit (ODU) overhead of the G.709 frame can be used, or any other suitable notification mechanism can be utilized in particular embodiments.

Accordingly, routers 404 and 410 may be provisioned with appropriate protection trigger thresholds. Due to some failure model, the corrected error rate may rise above the predetermined threshold on a WDM interface at router 410 for a predetermined amount of time (e.g., an "integration" time). As discussed above, router 410 may use some overhead in the G.709 frame in order to signal back to router 404 that a switch to a protection path should occur. Upon receipt of this defect indicator signal, router 404 may convey to a protection mechanism for this interface to switch away from the 422 link. Such a convergence mechanism can be IP FRR, MPLS FRR, or a standard IGP convergence mechanism, for example. Also in particular embodiments, other types of trigger, such as those not necessarily based on a maximum number of errors, but rather on a speed at which the BER grows, or any other mechanism for determining possible packet loss, can be employed. Accordingly, rapid growth of error rate, spiking of an error rate, or any other suitable change in such a rate, may also be an indication of upcoming trouble, even if the error rate is still below a given threshold.

While the protection scheme in particular embodiments may include diverting traffic away from interface/link 422, packets may continue to be transmitted on interface 422, thus allowing for the emptying of queues at router 404. Once the queue is empty in one embodiment, or after a fixed delay of several hundreds of milliseconds, router 404 can take interface/link 422 down. In parallel or shortly thereafter, router 410 may follow a similar process if the protection scheme is bidirectional. If the protection scheme is not bidirectional, or if path or link 420 is sufficiently functional, router 410 may not take action at this time. Once the link physically recovers, the link may be made active again if the error rate is below some other predetermined threshold for a predetermined amount of time.

In particular embodiments, thresholds (e.g. trigger protection thresholds) can be experimentally determined. For example, for a standard FEC (GFEC) at 10G, as well as for enhanced FEC (EFEC) at 10G, a BER can be improved by several orders of magnitude over the BER of the uncorrected signal. In one experimentally determined case, a $10^{-3}$ FEC gain can be improved to a BER out value of $10^{-13}$, for example. Such a BER out value for an example $10^{-3}$ FEC gain can be improved to a BER out value of even less than $10^{-13}$ for EFEC, for example.

Under a forced switch operation, the protection scheme may keep the original path working, to allow packet queues to be emptied, before traffic may be diverted to the protection path. Since pre-FEC errors may not manifest in real packet errors, the scheme may proactively switch away from an impending problem in a hitless or near-hitless fashion, depending on the convergence time for the scheme and the particular failure mode.

Such a proactive protection scheme in particular embodiments can protect against most major failures of the optical transport layer, particularly the WDM transmission signal optical signal-to-noise ratio (OSNR) degradation due to amplifier noise or amplified spontaneous emission (ASE), chromatic, or PMD. In particular embodiments, the scheme may also protect in hitless fashion against outside plant fiber cuts, likely manifested in increased pre-FEC errors, before a cable breaks.

Another key failure mode that can be addressed in particular embodiments is patch cord disconnection due to human error. Such a disconnection can take tens of milliseconds, for example. Although the physical impairments may manifest differently in terms of magnitude and/or duration of the failure, particular embodiments can allow for adjustment of the protection trigger threshold setting to accommodate many of these effects.

As discussed above, the protection trigger threshold can be set automatically by the system, or programmed by a user, and may be experimentally determined, for example. For such an experimental determination, an observed error rate can be utilized. In addition, a predetermined calculation time or integration window can be set (e.g., automatically, or set by a user) for waiting once a cumulative number of corrected bits has exceeded the protection trigger threshold. For example, a setting for calculation time units or an integration time to observe before triggering a switch for protection purposes can be based on a BER value (e.g., a BER of $10^{-5}$ may correspond to a calculation time of 10 ms). For a lower BER, such a calculation or integration time can be increased in particular embodiments.

Figure 5:
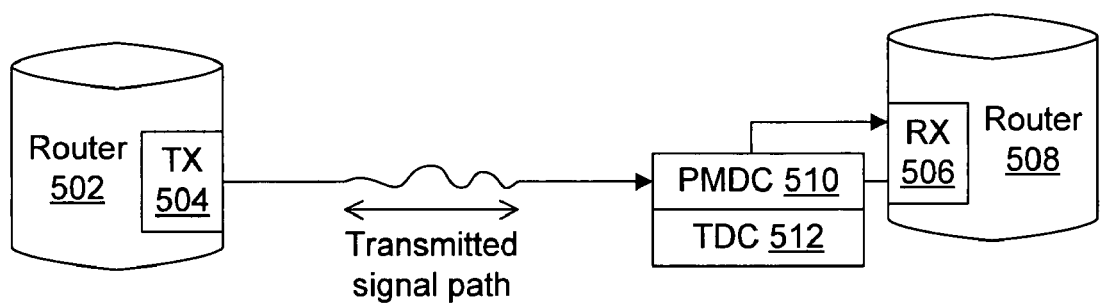
FIG. 5 illustrates an example 40G transmit and receive protection structure.

Referring now to FIG. 5, an example 40G transmit and receive protection structure is shown and indicated by the general reference character 500. Router 502 can include a 40G transmitter 504. Such 40G transmission can use tunable devices for compensation of dispersion. For example, optical routing environments can include polarization mode dispersion compensation (PMDC) 510 and tunable chromatic dispersion compensation (TDC) 512 coupled to receiver 506 in router 508. Modules PMDC 510 and TDC 512 can also be integrated within router 508 in particular embodiments. Router 508 can also include FEC correction mechanisms, for example. Accordingly, additional triggers for FRR can be defined (e.g., not necessarily based on pre-FEC BER) by tuning devices PMDC 510 and TDC 512, as they reach the limit of their ability to correct for dispersion.

Figure 6:
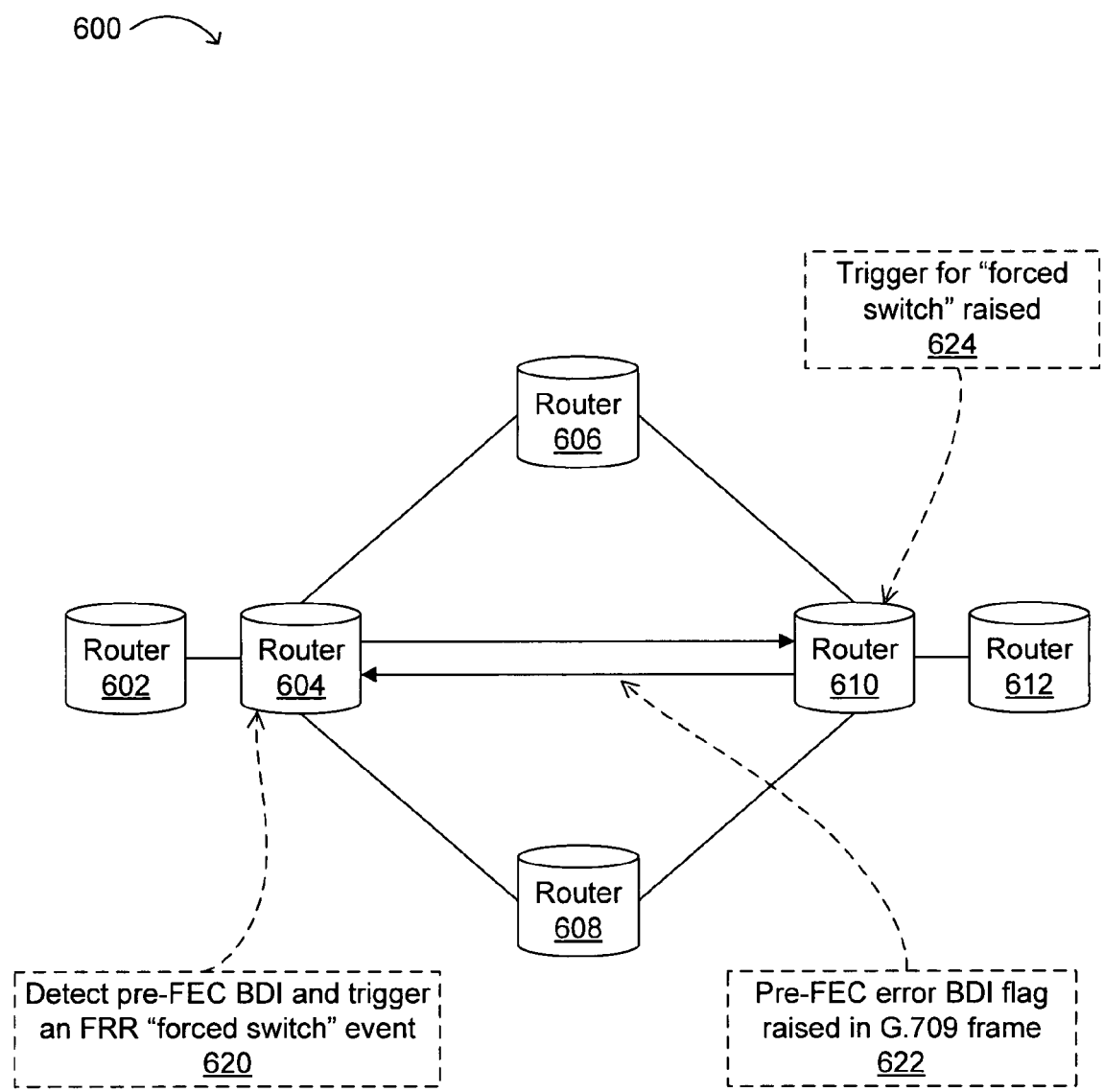
FIG. 6 illustrates an example backward defect indicator (BDI) in a protection scheme.

Referring now to FIG. 6, an example backward defect indicator (BDI) in a protection scheme is shown and indicated by the general reference character 600. Example routers 602, 604, 606, 608, 610, and 612, can be arranged as shown. In this particular example, a trigger or flag for a "forced switch" can be raised (624) in router 610. A pre-FEC error BDI flag may be raised in a G.709 frame (622) along a link from router 610 to router 604. Router 604 can then detect the pre-FEC BDI, and trigger an FRR forced switch event (620).

Regenerators may also be present between routers (e.g., routers 604 and 610 of FIG. 6). In such a case, the forced switch signaling message in a G.709 frame may propagate through other regenerators on a path to routers 604 and 610. In addition, a failing link may be immediately adjacent to a regenerator, for example. In these cases, the regenerator may detect the condition based on the predetermined thresholds discussed above, and may initiate signaling toward the routers on both ends of the link.

Figure 7:
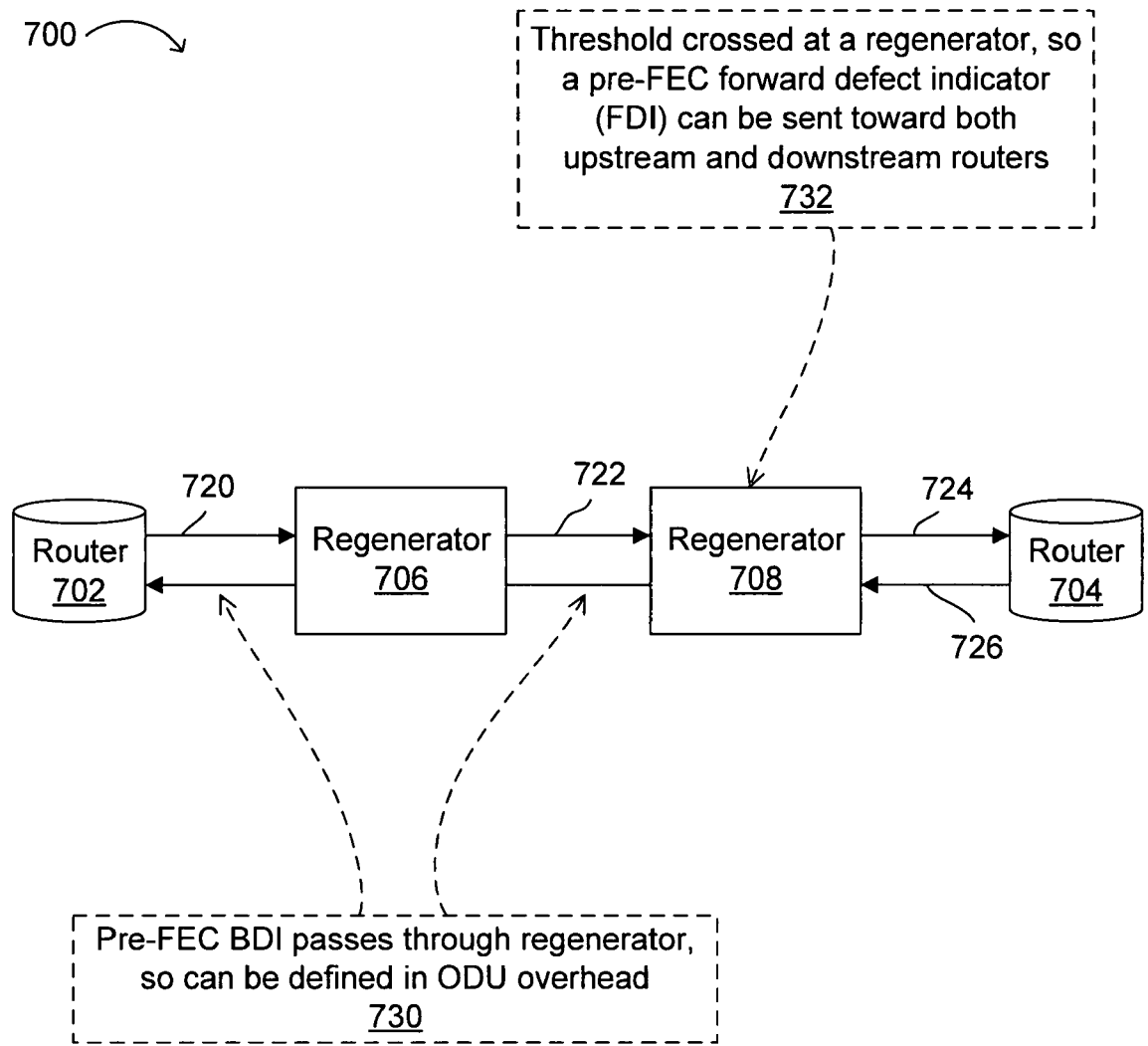
FIG. 7 illustrates an example router and regenerator arrangement.

Referring now to FIG. 7, an example router and regenerator arrangement is shown and indicated by the general reference character 700. A regenerator (e.g., 706) can receive an optical signal (e.g., 720), convert the optical signal to an electrical signal, and then regenerate a new optical signal (e.g., 722) from that electrical signal. In some cases, degraded signals can occur between regenerators, so the regenerators can participate (e.g., via a software enabled card and/or framer chip that contains FEC functionality) in proactive protection approaches in particular embodiments. Thus, similar to router interfaces described above, regenerators can utilize FEC to improve the incoming signal, and creates a new FEC on an outgoing interface towards the next regenerator/router downstream.

Router 702 can supply a signal 720 to regenerator 706. Regenerated signal 722 can be regenerated again to signal 724 using regenerator 708. Router 704 can receive regenerated signal 724, and provide signal 726 to regenerator 708. In one example, signal 722 can suffer from high impairments that may cause the pre-FEC BER level to rise above the predefined threshold in regenerator 722. As a result, the regenerator may send a pre-FEC BDI signal via ODU overhead (e.g., in G.709 frames), or any appropriate bit or flag, back towards router 702. The BDI signal can pass through regenerator 706, such that ODU overhead (e.g., in G.709 frames), or any appropriate bit or flag, can be utilized (730) to signal router 702. To ensure router 704 is aware of the failure, a pre-FEC forward defect indicator (FDI) can be sent to both upstream and downstream routers (732). In this fashion, regenerators can be enabled for proactive protection to accommodate signal degradations on links between regenerators where routers in the same network may not have appropriate visibility to see those signal degradations.

Figure 8:
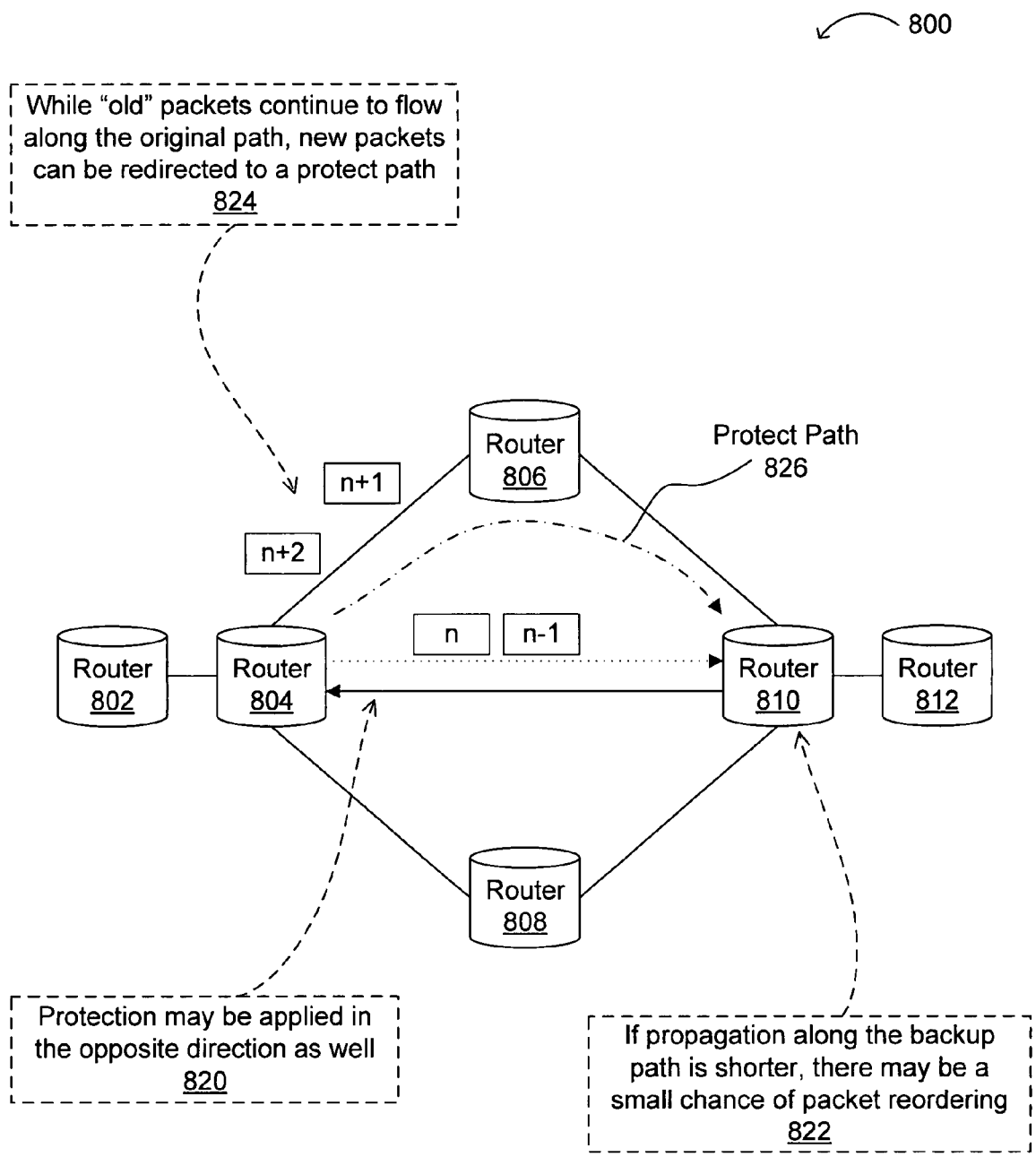
FIG. 8 illustrates an example router protection process.

Referring now to FIG. 8, an example router protection process is shown and indicated by the general reference character 800. In this particular example, routers 802, 804, 806, 808, 810, and 812, can be arranged as shown. Here, a link from router 804 to router 810 may have a degraded signal, resulting in a redirection to protect path 826 (e.g., via router 806). While "old" packets (e.g., n−1, n) can continue to flow along the original path, new packets (e.g., n+1, n+2) can be redirected to a protect path (824). In addition, after a predetermined time (e.g., on the order of hundreds of milliseconds) has passed, the interface may be taken down. This predetermined time may be sufficient such that no traffic remains along the failed path, for example.

Protection may also be applied in the opposite direction (e.g., from router 810 to router 804) (820). Further, if propagation along a backup path is shorter, there may be a relatively small chance of packet reordering (822). Similar principles can also work for both MPLS FRR and IP FRR. However, in MPLS FRR, the protect path may be fully specified ahead of time (e.g., in the form of a backup tunnel), while in IP FRR, only a first hop may be specified ahead of time. Once at a next node, packets may use normal IP forwarding techniques to reach the destination.

In particular embodiments, instead of relying on longer propagation on a backup path, router 804 can send a special "end of queue" message to the working interface, which router 810 can utilize such that packets may not get out of order. Router 810 can buffer new messages coming from the protect tunnel until router 810 receives the "end of queue" message from the original working tunnel. Also in particular embodiments, a trigger to switch over can be supplied from a manual condition inserted by a technician, signifying that the technician wants to bring down a transmission link for maintenance. The condition can be inserted via a management system at a regenerator site, or at an amplifier site, for example.

Particular embodiments can also be implemented between a transponder and a short reach interface on a router in a non-integrated IP+Optical system. In this particular example, the signaling message to trigger a forced switch may be extended to the short reach interface such that it can reach the router. This can be accomplished by using G.709 on the short reach interface, or by using an out-of-band signaling message. For example, the same signaling byte planned for a router-to-router link may also be included. In this sense, the transponder can function similarly to a regenerator in terms of passing the signaling through. In using an out-of-band signaling message, such as building upon an LMP, as discussed above, the signaling can be conveyed to the router to yield relatively fast switching times.

In particular embodiments, as discussed above, bit error correction data within an FEC mechanism can be used to trigger a switch to a protect path before the error rate exceeds a capacity of FEC to correct the errors. Further, FRR signaling and protection can be modified to allow for switching of traffic without substantial packet loss by not shutting either side of an interface down, and by moving traffic to a protected interface before the primary interface carrying traffic sees a real loss of data due to a degraded or otherwise bad signal.

Figure 9:
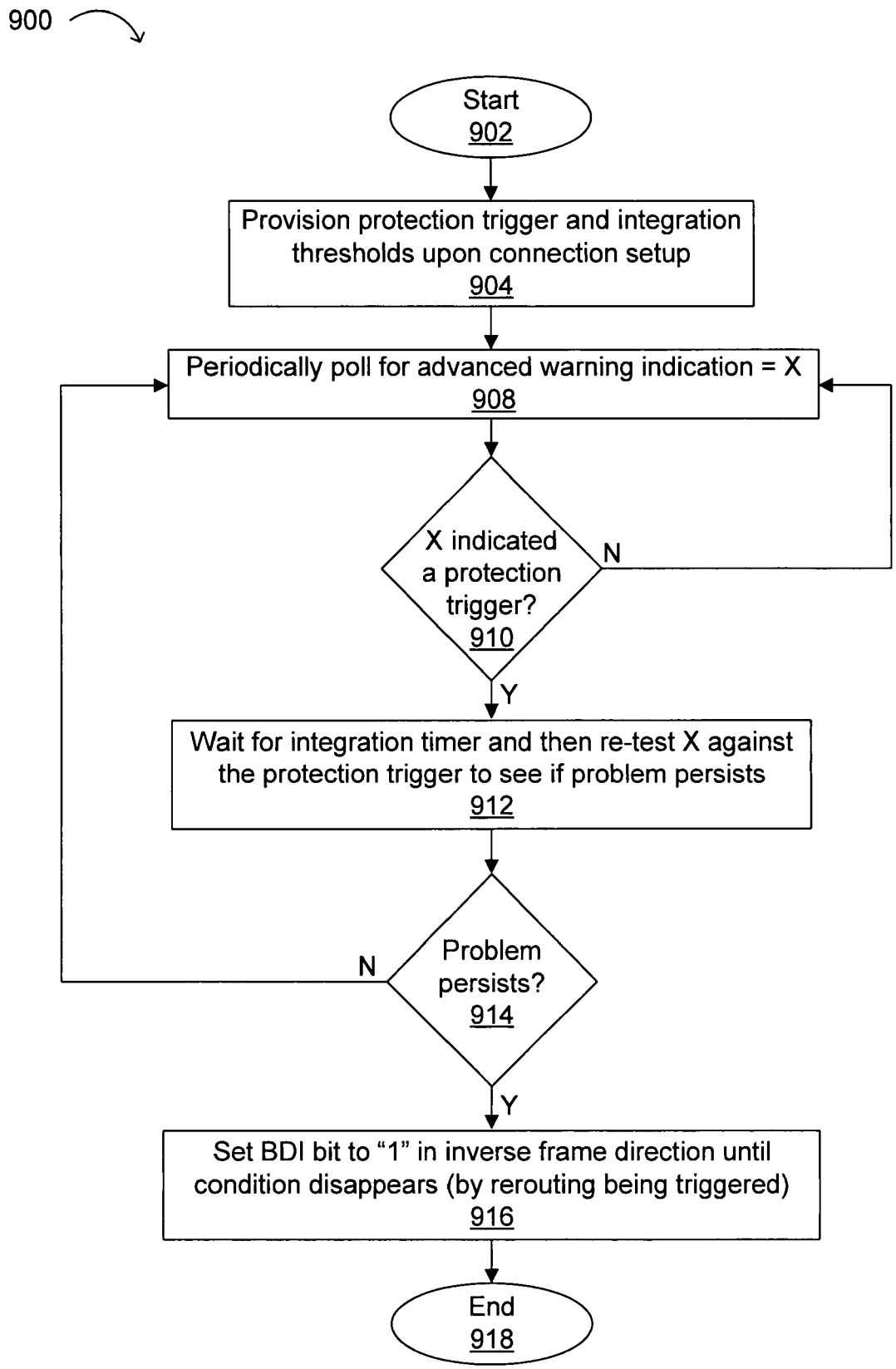
FIG. 9 illustrates an example proactive protection flow for a receiving end.

Referring now to FIG. 9, an example proactive protection flow for a receiving end is shown and indicated by the general reference character 900. The flow can begin (902), and protection trigger and integration thresholds can be provisioned (e.g., set by a user) upon connection setup (904). As discussed above, such thresholds can be automatically provided, and/or may be experimentally determined. Also, FEC may be used to correct for errors in received frames, and a transmitting device (e.g., a router/transponder) can provide a computed FEC per frame.

Periodically, an advanced warning condition can be polled, where this advanced warning condition may relate to a physical quantity representing the quality of the signal such as or level may be errors, denoted as "X" (908). If X implies that no advance warning is present (910), the flow can return to periodically poll for advanced warning condition (908). However, if X implies an advance warning is present (910), X can be reevaluated after waiting for the integration threshold to pass to determine if the problem persists (912). If the problem (e.g., degraded signal) no longer persists (914), the flow can return to periodically poll for advanced warning condition (908). However, if the problem persists (914), the BDI bit may be set to "1" in an inverse frame direction until the condition is removed (e.g. by rerouting being triggered) (916), and the flow can complete (918).

One example of an advanced warning indication includes pre-FEC or raw error rate monitoring. Also as discussed above, any type of advanced failure warning, such as an increased failure rate, a spike in failures, or the like, could also be used in particular embodiments. Also, operator override can be used in place of an advanced failure warning so that an operator can take down a piece of equipment for maintenance. In addition, a revert threshold and a second integration period threshold may also be set to accommodate returning a link to a usable status. For example, once the pre-FEC BER is below the revert threshold for the second integration threshold time, the BDI bit may be reset (e.g., set to "0"). Once such a reset value of BDI is detected by a receiving network device, the link can again be declared as usable. In addition, the thresholds discussed herein may be dynamically adjusted as part of an ongoing process.

Figure 10:
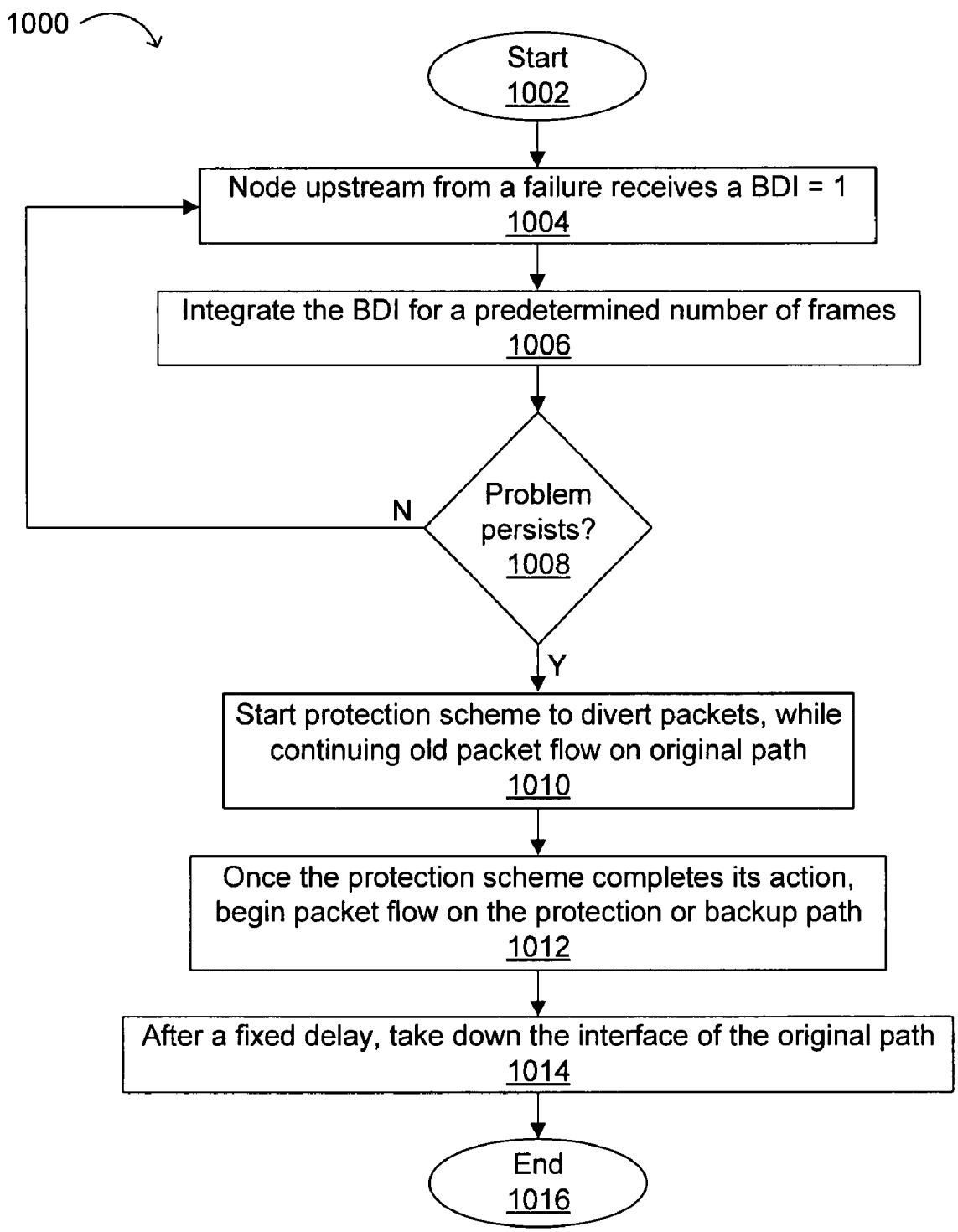
FIG. 10 illustrates an example proactive protection flow for a transmitting end.

Referring now to FIG. 10, an example proactive protection flow for a transmitting end is shown and indicated by the general reference character 1000. The flow can begin (1002), and a node upstream from a failure can receive a BDI=1 (1004). The BDI can be integrated for a predetermined number of frames (1006). For example, the integration can occur over 3 frames. If the problem does not persist (1008), the flow can return to awaiting to receive a BDI=1 value (1004). However, if the problem does persist (1008), the protection scheme to divert packets can begin, while continuing old packet flow on the original path (1010). After a predetermined time (e.g., 10s of ms), packet flow on the protection/backup path can begin (1012). Then, after a fixed delay, the interface of the original path can be taken down (1014), and the flow can complete (1016).

Figure 11:
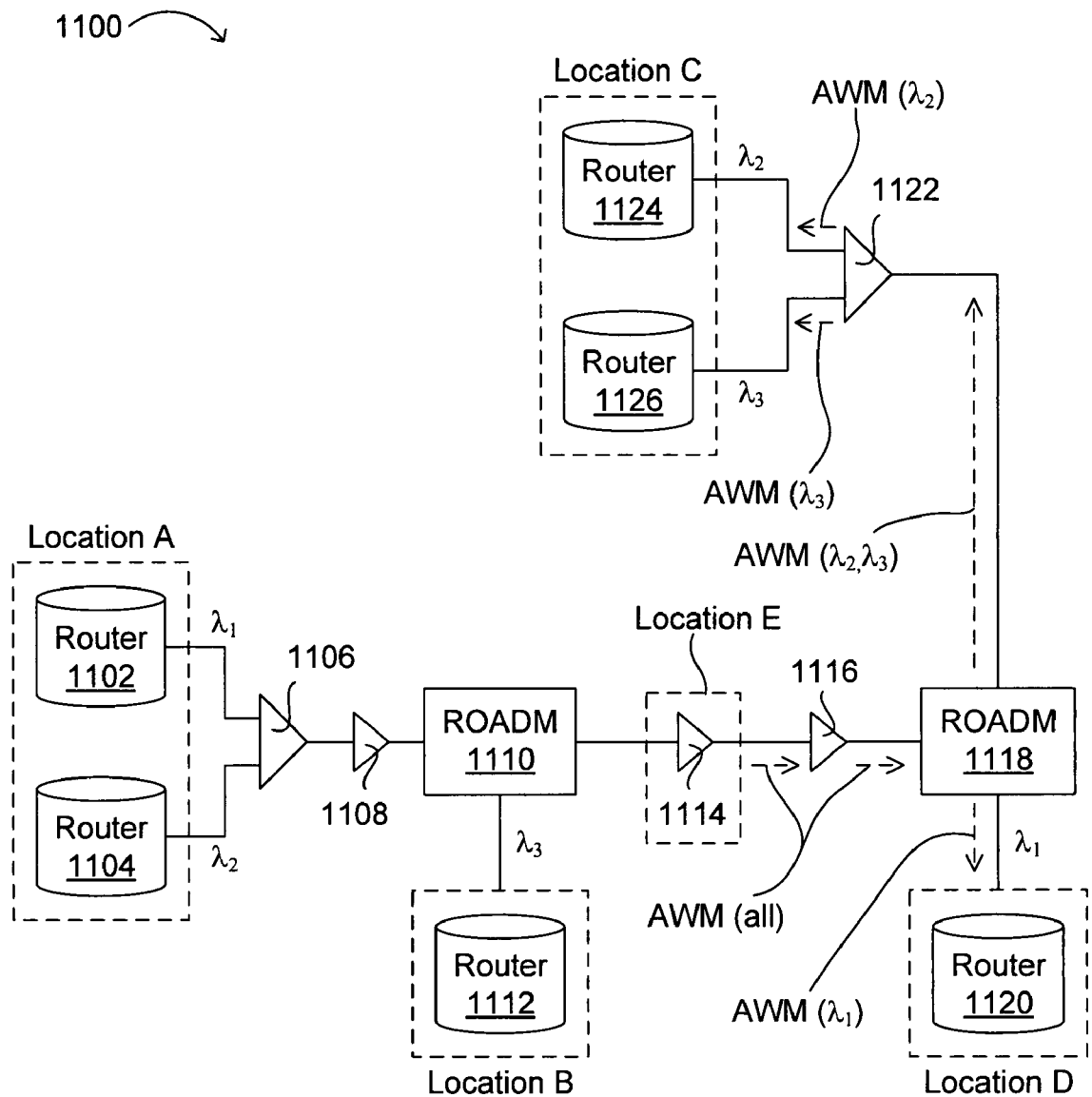
FIG. 11 illustrates an example operator override advanced warning system.

Referring now to FIG. 11, an example operator override advanced warning system is shown and indicated by the general reference character 1100. Location A can include routers 1102 and 1104, utilizing wavelengths $\lambda_1$ and $\lambda_2$, respectively. Wavelength combiner/splitter 1106 can connect signals having wavelengths $\lambda_1$ and $\lambda_2$ to amplifier 1108, for connection to reconfigurable optical add-drop multiplexer (ROADM) 1110. ROADM 1110 may add wavelength $\lambda_3$ from router 1112 in location B to the fiber towards amplifier 1114 in location E. Fiber can also connect amplifier 1114 to amplifier 1116. ROADM 1118 may remove wavelength $\lambda_1$ for router 1120 in location D. Also, ROADM 1118 may remove, and pass via combiner/splitter 1122, wavelength $\lambda_2$ to router 1124, and wavelength $\lambda_3$ to router 1126.

In location E, an operator may choose to take down amplifier 1114, such as for maintenance purposes. In such an operator override situation, advanced warning messages (AWM) may be sent along paths for notification, with appropriate wavelengths included. For example, an AWM for all wavelengths may be passed through amplifier 1116, while AWM ($\lambda_1$) may be passed between ROADM 1118 and router 1120 in location D to notify router 1120 that $\lambda_1$ is about to go down. From ROADM 1118 to combiner/splitter 1122, an AWM ($\lambda_2$, $\lambda_3$) can be provided. From combiner/splitter 1122 to location C, an AWM ($\lambda_2$) can be sent to router 1124, while an AWM ($\lambda_3$) can be sent to router 1126. In this fashion, in operator induced trigger may be utilized, and a system may map an associated notification message to different wavelengths, as may be required. Once such appropriate AWMs are propagated, protection paths (not shown in the figure) can be taken as described above. For example, routers 1102 and 1120 may switch traffic away from XI to a protection path.

In particular embodiments, error-less and loss-less data transmission can be provided without adding significant consumer costs. Hitless FRR can allow for switching traffic before a failure occurs, as opposed to conventional approaches whereby the switch can occur after the failures occur, and with associated traffic loss. Many failures manifest themselves in increased error rates over tens to hundreds of milliseconds, and can be addressed using particular embodiments.

Although the description has been described with respect to particular embodiments thereof, these particular embodiments are merely illustrative, and not restrictive. For example, while particular types of devices and network arrangements have been described, other devices and/or arrangements can also be supported in particular embodiments. For example, any type of network device, such as a layer 2 switch (e.g., Ethernet or Provider Backbone Transport (PBT) switch), or a layer 3 switch (e.g., an MPLS or Transport-MPLS (TMPLS) switch), an optical layer device, or any suitable layer 2 or layer 3 devices, can be utilized in particular embodiments.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store, the program for use by or in connection with the instruction execution system, apparatus, system, or device. The computer readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that what is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. An apparatus, comprising:
    logic configured to monitor a raw error rate on a first link between first and second network devices;
    logic configured to detect an advanced warning indication on the first link from the raw error rate exceeding a predetermined value, the advanced warning indication being indicative of an upcoming degraded signal condition; and
    logic configured to trigger packet traffic rerouting from the first link to a second link in response to the advanced warning indication and prior to occurrence of the degraded signal condition on the first link, wherein the degraded signal condition is related to an error correction threshold that is greater than the predetermined value.

2. The apparatus of claim 1, further comprising logic configured to program the predetermined value to experimentally determine an optimal value for the predetermined value relative to the error correction threshold.

3. The apparatus of claim 1, wherein the error rate on error correction threshold indicates a tolerable limit for correction of errors on the first link using forward error correction (FEC).

4. The apparatus of claim 1, wherein the advanced warning indication further comprises an operator override, the operator override being configured to affect the first and/or the second device on the first link regardless of the monitored raw error rate.

5. The apparatus of claim 1, wherein the degraded signal condition comprises a number of corrected bits passing on the first link exceeding a protection trigger threshold for a time related to an integration threshold.

6. The apparatus of claim 1, further comprising logic configured to insert a defect indicator into a frame for transmission to the first and/or the second network device.

7. The apparatus of claim 6, wherein the defect indicator comprises a flag in a G.709 frame.

8. The apparatus of claim 1, wherein the first and/or the second network device comprises logic configured to implement a transponder function.

9. The apparatus of claim 1, further comprising an external transponder coupled to the first and/or the second network device.

10. The apparatus of claim 1, wherein the first and/or the second network device comprises an interface configured for dense wavelength-division multiplexing (DWDM).

11. The apparatus of claim 1, further comprising polarization mode dispersion compensation (PMDC) and/or tunable chromatic dispersion compensation (TDC) circuitry configured to provide the advanced warning indication.

12. The apparatus of claim 1, wherein the logic configured to detect the advanced warning indication comprises logic configured to analyze forward error correction (FEC) on the first link.

13. A method, comprising:
    monitoring a raw error rate on a first link between first and second network devices;
    detecting in the first network device an advanced warning indication from the raw error rate exceeding a predetermined value, the advanced warning indication being indicative of an upcoming degraded signal condition on the first link; and
    transmitting an advanced warning indication from the first network device to the second network device and triggering packet traffic rerouting from the first link to a second link in response to the advanced warning indication and prior to occurrence of the degraded signal condition on the first link, wherein the degraded signal condition is related to an error correction threshold that is greater than the predetermined value.

14. The method of claim 13, further comprising programming the predetermined value to experimentally determine an optimal value for the predetermined value relative to the error correction threshold.

15. The method of claim 14, further comprising continuing a flow of packets on the first link until a queue is emptied.

16. The method of claim 14, further comprising reverting the first link to a usable status when the degraded signal condition no longer exists.

17. The method of claim 13, wherein the monitoring the raw error rate comprises periodically polling a forward error correction (FEC).

18. The method of claim 13, wherein the transmitting the advanced warning indication comprises setting a defect indicator flag in a frame on the first link.

19. The method of claim 18, wherein the frame comprises a G.709 frame.

20. The method of claim 13, wherein the detecting the advanced warning indication comprises using an operator override.

21. The method of claim 13, further comprising using polarization mode dispersion compensation (PMDC) and tunable chromatic dispersion compensation (TDC) circuitry coupled to the first network device for providing the advanced warning indication.

22. The method of claim 13, wherein the detecting the advanced warning indication comprises analyzing forward error correction (FEC) on the first link.

23. A means system for proactively protecting packet traffic, the system comprising:
    means for providing a predetermined value and an error correction threshold that is greater than the predetermined value;
    means for monitoring a raw error rate on a first link between first and second network devices;
    means for detecting an upcoming degraded signal condition on the first link in response to the raw error rate exceeding the predetermined value;
    means for providing advanced warning of the upcoming degraded signal condition to the first or the second network device;
    means for triggering a rerouting of packet traffic from the first link to a second link in response to the advanced warning and prior to occurrence of the degraded signal condition, wherein the degraded signal condition is related to the error correction threshold; and
    means for a reverting the first link to a usable status when the degraded signal condition no longer exists.

* * * * *